United States Patent
Pullen et al.

(10) Patent No.: US 6,198,813 B1
(45) Date of Patent: Mar. 6, 2001

(54) SYSTEM AND METHOD FOR PROVIDING CALL PROCESSING SERVICES USING CALL INDEPENDENT BUILDING BLOCKS

(75) Inventors: Steve M. Pullen, Rowlett; Navdeep G. Singh; Shahrooz S. Kasrai, both of Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/941,683

(22) Filed: Sep. 30, 1997

(51) Int. Cl.[7] .................................................. H04M 3/42
(52) U.S. Cl. ............................................ 379/201; 379/207
(58) Field of Search .................................... 379/201, 202, 379/203, 207, 211, 67.1; 707/104, 200; 710/1; 717/1–11

(56) References Cited

U.S. PATENT DOCUMENTS

| | | | |
|---|---|---|---|
| 5,511,116 | * 4/1996 | Shastry et al. | 379/201 |
| 5,553,127 | * 9/1996 | Norell | 379/20.7 |
| 5,724,406 | * 3/1998 | Juster | 379/201 |
| 5,757,900 | * 5/1998 | Nagel et al. | 379/207 |
| 5,802,159 | * 9/1998 | Smolentzov et al. | 379/201 |
| 5,937,412 | * 8/1999 | Kohli et al. | 707/104 |
| 5,999,525 | * 12/1999 | Krishnaswamy et al. | 370/352 |

FOREIGN PATENT DOCUMENTS 9621310   7/1996   (WO) .............................. H04M/3/42

OTHER PUBLICATIONS

M. Wennerberg, et al., "An Advanced Service Creation Environment Using SIBs", Annual Review of Communications, vol. 47, Jan. 1, 1993, pp. 454–459.

P. Daryani, et al., "Object–Oriented Modelling of the Intelligent Network and its Application to Universal Personal Telecommunications Service", Proceedings of the International Council for Computer Communication Intelligent Networks Conference, Tampa, May 4–6, 1992, pp. 391–406.

B. Ku, "A Reuse–Driven Approach for Rapid Telephone Service Creation", International Conference on Software Use, IEEE, Nov. 1, 1994, pp. 64–72.

* cited by examiner

Primary Examiner—Jack Chiang
Assistant Examiner—Benny Q. Tieu
(74) Attorney, Agent, or Firm—Baker Botts L.L.P.

(57) ABSTRACT

A call logic program (30) is provided that is composed of individual call independent building blocks (10) and grouped call independent building blocks (20). Call independent building blocks (10) provide base functionality in a program and can be grouped and combine to form call logic program (30). Call logic program (30) is parsed upon initialization into a plurality of tokens (42) which are stored in a token collector (44). When needed, an interpreter (46) process the token collector (44) to execute the call logic program (30).

13 Claims, 2 Drawing Sheets

SYSTEM AND METHOD FOR PROVIDING CALL PROCESSING SERVICES USING CALL INDEPENDENT BUILDING BLOCKS

TECHNICAL FIELD OF THE INVENTION

The present invention relates to the field of telecommunication services and more particularly to a system and method for providing call processing services using call independent building blocks.

BACKGROUND OF THE INVENTION

In the modern telecommunication network a myriad of services and functions are offered both as conveniences to the end users and as necessities for running the network. These services require complex programming, representing thousands upon thousands lines of code. When a new service is required, programmers typically must start from scratch, writing many more lines of code.

In traditional interpreted computer languages, a program is interpreted one line at a time upon execution. Depending on the length of the program, the complexity of the programming language and the ability of the interpreter, execution can be a time consuming process.

What is needed is an architecture that provides a programmable software environment that allows fast implementation of new call processing services that are executed as fast and efficiently as possible.

SUMMARY OF THE INVENTION

From the foregoing, it may be appreciated that a need has arisen for a method and system for providing call processing services using call independent building blocks. In accordance with the present invention, call independent building blocks for service creation are provided which substantially eliminates or reduces disadvantages and problems associated with programming methods.

In accordance with one embodiment of the present invention, a system for providing call processing services includes a call logic program having a plurality of call independent building blocks. Each of the call independent building blocks perform a specific function and are joined together to form the call logic program. A parser is also included. The parser parses the call independent building blocks in the call logic program into a plurality of tokens upon initiation of the call logic program. A token collector is provided to collect the tokens. An interpreter interprets the tokens in the token collector upon execution of the program.

In accordance with another embodiment of the present invention, a call logic program for providing telephony services running on a computer with a processor and memory is provided which includes a plurality of call independent building blocks. Each call independent building block perform a specific task and are linked together to form the call logic program.

An important technical advantage of the present invention includes the ability to reuse call independent building blocks in different programs, thus eliminating the need to rewrite programming code when a new service is required. Another technical advantage of the present invention includes the ability to parse the call logic program ahead of time, before execution. This increases the performance of the call logic program. Other technical advantages are readily apparent to one skilled in the art from the following figures, descriptions and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals used for like and corresponding parts of the various drawings.

Figure 1:
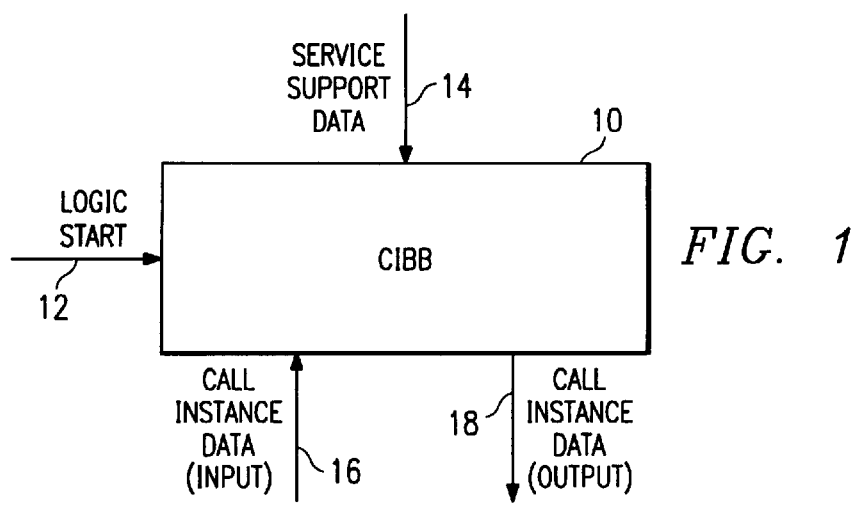
FIG. 1 is a block diagram representative of a call independent building block (CIBB)

FIG. 1 is a block diagram representative of a call independent building block (CIBB) 10. CIBB 10 is a reusable software entity that is designed to create service features. CIBBs 10 are designed to provide the basic function from which higher level call processing functions can be built. CIBBs 10 can be thought of as building blocks. While an individual block may have a limited function, multiple blocks can be combined together to create a complete substructure or structure.

CIBBs 10 are designed to be linked together in order to provide new services. Each CIBB 10 contains a basic function, with the entire collection of CIBBs 10 representing all the basic functions ever needed to develop call processing software. CIBBs 10 can also be grouped together to form new functions or even a complete call processing service. Additionally, CIBBs 10 are independent from any service they may be used to formulate, therefore, each CIBB 10 can be used multiple times within a particular call service or used in a new call service.

In a particular embodiment, CIBBs 10 are objects in an object oriented programming language, such as C++.

In FIG. 1, CIBB 10 has a logic start 12. All CIBBs 10 have one logical starting point and one or more logical end points. Logic start 12 is the initialization or starting point for each CIBB 10. It sets the initialization conditions for each CIBB such as what specific information to receive and what response to generate. A service support data 14 is provided as an input. Service support data 14 is the input data required for a particular service. It can be information such as calling line identity, the called party, or any other input required for a specific service. Also provided as an input is a call instance data input 16. Call instance data input 16 is data inputs which are specific to a particular call, such as routing lists, the trunk group a call came in on or other inputs relating to a specific call. A call instance data output 18 is data outputs which are specific to a particular call, such as a route list. The call instance data output 18 from one CIBB 10 can be a call instance data input 16 for another CIBB 10. In this way, CIBBs 10 can be combined as a chain or group. The call instance data output 18 can also be the end result of a call processing service.

Figure 2:
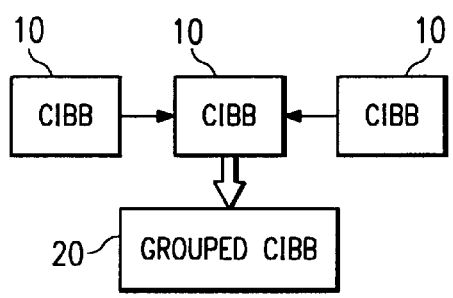
FIG. 2 is a block diagram of grouped CIBBs.

FIG. 2 is a block diagram of a grouped CIBBs 20. CIBBs 10 can be grouped together to form complete call logic programs or parts of call logic programs. For example, if a call logic program for billing a phone call is needed, individual CIBBs 10 may exist for metering the call, for writing the results to a file, or for any of the other parts a billing program needs. These individual CIBBs 10 can be grouped together to form group CIBB 20 for phone billing. Grouped CIBBs 20 can be reused in other applications, just like individual CIBBs 10.

Figure 3:
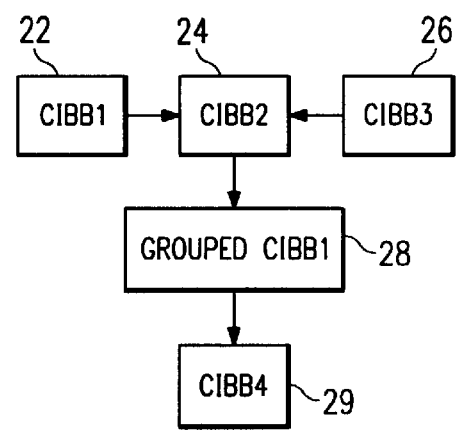
FIG. 3 is a graphical representation of individual CIBBs which are chained together and chained to a group CIBB.

FIG. 3 is a graphical representation of individual CIBBs 10 which are linked together and linked to a group CIBB 20 in order to form a new program or a new telephony service. Assuming that FIG. 3 represents an 800 billing service, a first CIBB, CIBB1 22 receives a call. A second CIBB, CIBB2 24 screens the call to see if it is a valid 800 number. If not, CIBB3 26 returns an error message. If it is a valid 800 number, a grouped CIBB1 meters the call and determines the billing. A CIBB4 29 then writes the billing record to a specific location. The CIBB functionality discussed in this example is by way of example only and an actual CIBB 10 may not have the functionality described in this example.

Figure 4:
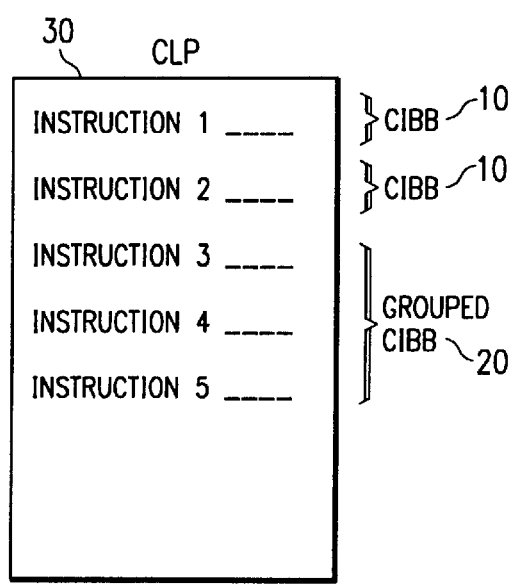
FIG. 4 is a graphical representation of a call logic program.

FIG. 4 is a graphical representation of a call logic program (CLP) 30. Call logic program 30 is a complete call processing service or some part of a call processing service. In a given call processing service, one or more CLPs 30 may exist. A CLP 30 is a computer program with a list of computer instructions that, when carried out, executes the service. Each instruction or group of instruction can be represented as a CIBB 10. A CLP 30 may also include grouped CIBBs 20.

Figure 5:
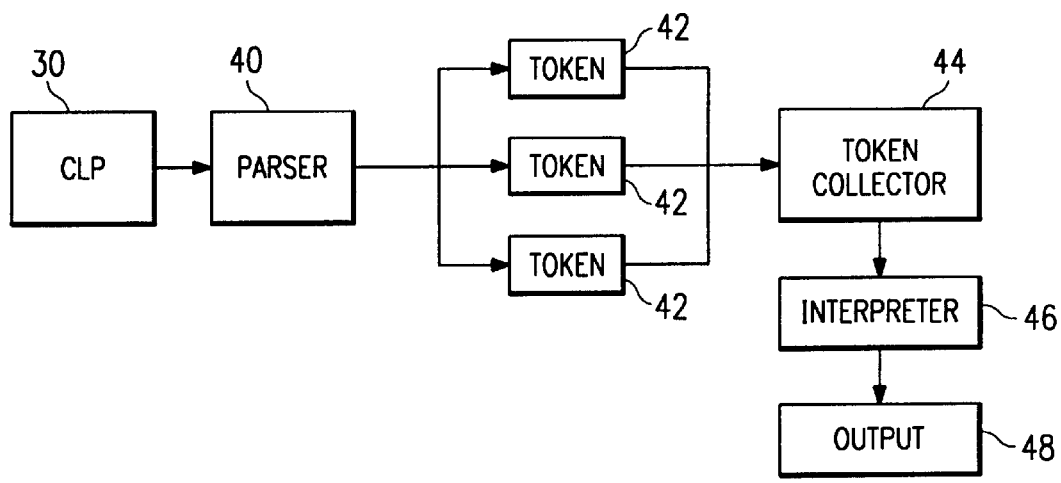
FIG. 5 is a diagram showing the execution of a call logic program.

FIG. 5 is a diagram showing the execution of a call logic program 30. CLP 30 can be a complete program or call processing service. CLP 30 is passed through a parser 40. Parser 40 parses the code of CIBB 10 into one or more tokens 42. Tokens 42 are the minimal amount of information that can be processed by an interpreter. They are logical representations of the commands found in the CIBB 10 code. In C++, a keyword such as "virtual" might be considered as a token since it is the smallest element the compiler processes. In this case, the commands, keywords and variables used in each CIBB 10 are broken down into the smallest logical representation that can be processed by the interpreter. Tokens 42 are then collected in a token collector 44. Token collector 44 stores tokens 42 in any logical fashion, whether it is first in/last out, last in/first/out or some other way of storing tokens. These steps are completed when the program initiates and token collectors 44 are stored for later use during call logic program execution. When token collector 44 is accessed, tokens 42 are interpreted and executed by an interpreter 46.

Figure 6:
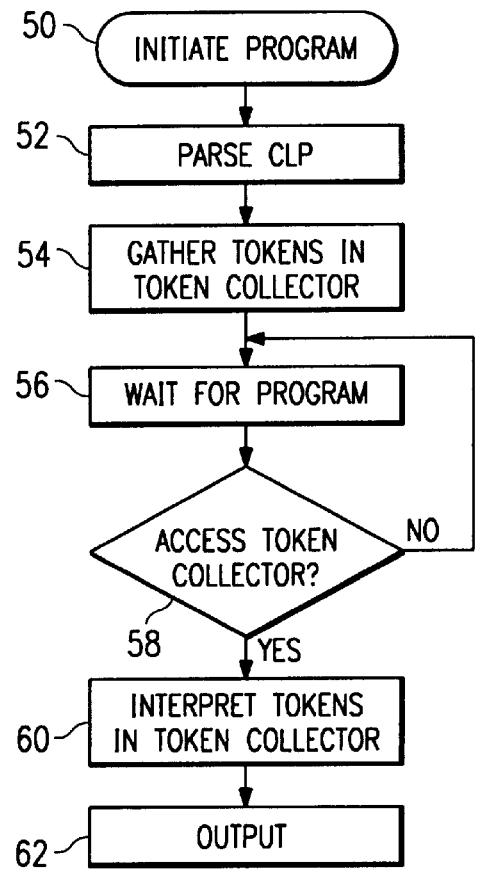
FIG. 6 is a flowchart of the execution of a call logic program.

FIG. 6 is a flowchart of the execution of a call logic program 30. In step 50, the call logic program is initiated. The program can consist of one CLP 30 or several CLPs 30 operating together. Additional CLP 30 can be comprised of one or more CIBBs 10 or grouped CIBBs 20, or CLP 30 itself may be a grouped CIBB 20. After initiation, CLP 30 is parsed into a plurality of tokens 42 in step 52. Tokens 42 are then stored in a token collector 44 in step 54. Tokens 42 represent the minimal amount of information that can be processed. In step 56, token collector 44 awaits interpretation. The process of parsing prior to use is known as advanced parsing. It is faster than simply interpreting CLP 30 when needed.

Step 58 determines if the token collector 44 needs to be accessed. If so, tokens 42 are interpreted in step 60. The program executes its function in step 62.

Thus, it is apparent that there has been provided, in accordance with the present invention, call independent building blocks for service creation that satisfies the advantages set forth above. Although the preferred embodiment has been described in detail, it should be understood that various changes, substitutions and alterations can be made herein without departing from the spirit and scope of the invention as defined by the appended claims.

What is claimed is:

1. A call logic program for providing telephony services running on a computer with a processor and memory, comprising:

a plurality of call independent building blocks wherein each call independent building block are operable to perform a specific task and are linked together to form the call logic program, the plurality of call independent building blocks being parsed into a plurality of tokens upon generation of the call logic program and prior to execution of the call logic program.

2. The call logic program of claim 1, wherein the call independent building blocks can be joined to form grouped call independent building blocks, the grouped call independent building blocks operable to perform a new function.

3. The call logic program of claim 1, wherein the call independent building blocks and the grouped call independent building blocks are combined to form a specific service.

4. The call logic program of claim 1, wherein the plurality of tokens are stored in a token collector, awaiting execution.

5. The call logic program of claim 4, wherein the tokens in the token collector are executed by an interpreter, the execution of the tokens by the interpreter representing execution of the call logic program.

6. A method for providing telephony service comprising:

providing a plurality of call independent building blocks, each call independent building blocks operable to perform a specific task;

linking the plurality of call independent building blocks together to provide a call logic program;

parsing the call logic program into a plurality of tokens upon initialization and prior to execution of the call logic program; and storing the plurality of tokens in a token collector awaiting execution.

7. The method of claim 6, wherein the step of providing a plurality of call independent building blocks further comprises the step of forming grouped call independent building blocks from the plurality of call independent building blocks.

8. The method of claim 6, further comprising the step of interpreting the tokens, wherein interpretation of the tokens in the token collector represents execution of the call logic program.

9. The method of claim 6, wherein the call independent building blocks are reusable in other applications.

10. A system for providing call processing services comprising:

a call logic program having a plurality of call independent building blocks, each of the call independent building blocks operable to perform a specific function;

a parser operable to parse the call independent building blocks into a plurality of tokens upon generation of and prior to execution of the call logic program;

a token collector operable to collect the tokens; and an interpreter operable to interpret the tokens in the token collector, wherein the interpretation of the tokens represents execution of the call logic program.

11. The system of claim 10, wherein the call independent building blocks include:

a logic start;

a service input, operable to provide inputs related to providing a service;

a call instance data input, operable to provide call specific inputs; and a call instance data output, operable to output call specific data.

12. The system of claim 10, wherein the call independent building blocks are operable to be combined to form a grouped call independent building block, the grouped call independent building having a specific functionality.

13. The system of claim 10, wherein the token collector is operable to hold the plurality of tokens until needed.

* * * * *